US012689579B2

(12) United States Patent
Bascao et al.

(10) Patent No.: US 12,689,579 B2
(45) Date of Patent: Jul. 21, 2026

(54) ARTIFICIAL INTELLIGENCE-BASED LATENCY ANOMALY DETECTION IN A WIRELESS COMMUNICATIONS SYSTEM

(71) Applicant: T-Mobile USA, Inc., Bellevue, WA (US)

(72) Inventors: Michael C. Bascao, Renton, WA (US); John Barry Lazarte, Tukwila, WA (US); June Allan Malit, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 71 days.

(21) Appl. No.: 18/947,231

(22) Filed: Nov. 14, 2024

(65) Prior Publication Data

US 2026/0135797 A1     May 14, 2026

(51) Int. Cl.
| | |
|---|---|
| *H04L 43/0852* | (2022.01) |
| *H04L 45/00* | (2022.01) |
| *H04L 45/02* | (2022.01) |

(52) U.S. Cl.
CPC .......... *H04L 45/22* (2013.01); *H04L 43/0852* (2013.01); *H04L 45/08* (2013.01)

(58) Field of Classification Search
CPC ...... H04L 45/08; H04L 45/22; H04L 43/0852
See application file for complete search history.

(56) References Cited

U.S. PATENT DOCUMENTS

| | | |
|---|---|---|
| 7,519,564 B2 | 4/2009 | Horvitz |
| 7,698,055 B2 | 4/2010 | Horvitz et al. |
| 9,635,050 B2 | 4/2017 | Di Pietro et al. |
| 9,667,641 B2 | 5/2017 | Muddu et al. |
| 9,705,914 B2 | 7/2017 | Di Pietro et al. |
| 10,116,521 B2 | 10/2018 | Kokkula et al. |
| 10,122,740 B1 | 11/2018 | Finkelshtein et al. |
| 10,261,851 B2 | 4/2019 | Velipasaoglu et al. |
| 10,673,880 B1 | 6/2020 | Pratt et al. |
| 10,685,159 B2 | 6/2020 | Su et al. |
| 11,128,664 B1 | 9/2021 | Andersson et al. |
| 11,134,016 B2 | 9/2021 | Arora et al. |
| 11,201,882 B2 | 12/2021 | Mirsky et al. |
| 11,277,420 B2 | 3/2022 | Côté et al. |
| 11,475,368 B2 | 10/2022 | Shang et al. |

(Continued)

FOREIGN PATENT DOCUMENTS

| | | |
|---|---|---|
| CN | 112052149 A | 12/2020 |
| EP | 2737404 A1 | 6/2014 |

(Continued)

*Primary Examiner* — Hee Soo Kim
(74) *Attorney, Agent, or Firm* — Perkins Coie LLP

(57) ABSTRACT

A first machine learning model is used to determine multiple traffic patterns from the traffic data using multiple training patterns that represent the expected network latency of the core network. A second machine learning model is used to determine one or more user plane function events causing the anomalies using the traffic data. The second machine learning model identifies portions of the traffic data that include anomalies and determines the user plane function events using these portions. A reconfiguration command is transmitted to the core network to adjust one or more routing policies of the user plane function using the determined user plane function events.

20 Claims, 7 Drawing Sheets

(56)                   References Cited

U.S. PATENT DOCUMENTS

| 11,509,675 | B2 | 11/2022 | Srivastav et al. |
| 11,531,946 | B2 | 12/2022 | Liu et al. |
| 11,640,348 | B2 | 5/2023 | Bugdayci et al. |
| 11,663,067 | B2 | 5/2023 | Anghel et al. |
| 11,689,944 | B2 | 6/2023 | Vasudevan et al. |
| 11,716,338 | B2 | 8/2023 | Elyashiv et al. |
| 11,805,140 | B2 | 10/2023 | Baidya et al. |
| 11,831,556 | B2 | 11/2023 | Young et al. |
| 11,836,578 | B2 | 12/2023 | Qiu et al. |
| 11,848,843 | B2 | 12/2023 | Lukens et al. |
| 11,943,235 | B2 | 3/2024 | Wahbo |
| 11,943,245 | B2 | 3/2024 | Maria Vega et al. |
| 11,979,421 | B2 | 5/2024 | Allouche et al. |
| 12,020,566 | B2 | 6/2024 | Pittman et al. |
| 12,061,516 | B2 | 8/2024 | Juneja et al. |
| 12,069,069 | B2 | 8/2024 | Chasdai et al. |
| 12,088,611 | B1 | 9/2024 | Lin et al. |
| 12,113,686 | B2 | 10/2024 | Juneja et al. |
| 2017/0339022 | A1 | 11/2017 | Hegde et al. |
| 2019/0379592 | A1* | 12/2019 | Samadi ................. H04L 41/145 |
| 2020/0136957 | A1* | 4/2020 | Sanchez Charles .. H04L 45/021 |
| 2020/0389371 | A1* | 12/2020 | Tedaldi ................... H04L 45/28 |
| 2021/0029019 | A1* | 1/2021 | Kottapalli ............... H04L 45/08 |
| 2022/0053010 | A1 | 2/2022 | Elyashiv et al. |
| 2022/0255817 | A1 | 8/2022 | Hong et al. |
| 2022/0329522 | A1 | 10/2022 | Maciocco et al. |
| 2022/0368703 | A1 | 11/2022 | Jiang et al. |
| 2022/0394479 | A1 | 12/2022 | Singh et al. |
| 2023/0038164 | A1 | 2/2023 | Naeini |
| 2023/0083443 | A1 | 3/2023 | Saveliev et al. |
| 2023/0198855 | A1 | 6/2023 | Ganesan et al. |
| 2023/0291755 | A1 | 9/2023 | Siebel et al. |
| 2023/0403289 | A1 | 12/2023 | Karpovsky et al. |
| 2024/0016456 | A1 | 1/2024 | De Zambotti et al. |
| 2024/0056842 | A1 | 2/2024 | Masood et al. |
| 2024/0097999 | A1 | 3/2024 | Sun et al. |
| 2024/0137306 | A1* | 4/2024 | Delson ................... H04L 41/16 |
| 2024/0179158 | A1 | 5/2024 | Kommula et al. |

FOREIGN PATENT DOCUMENTS

| EP | 2944055 | A1 | 11/2015 |
| EP | 3380991 | A1 | 10/2018 |
| EP | 3642764 | A1 | 4/2020 |
| EP | 3716246 | A1 | 9/2020 |
| EP | 3767553 | A1 | 1/2021 |
| EP | 3797409 | A1 | 3/2021 |
| EP | 3839917 | A1 | 6/2021 |
| WO | 2017200651 | A1 | 11/2017 |
| WO | 2021028063 | A1 | 2/2021 |

* cited by examiner

300

302

Region X

304A   Market A

308

306A   UPF A

304B   Market B

310

306B   UPF B

304C   Market C

306C   UPF C

- - - - - ▶ Locally routed

───────▶ Non-locally routed

ARTIFICIAL INTELLIGENCE-BASED LATENCY ANOMALY DETECTION IN A WIRELESS COMMUNICATIONS SYSTEM

BACKGROUND

Network latency in a packet-switched network (e.g., 5G) is measured as either one-way (the time from the source sending a packet to the destination receiving the packet) or round-trip delay time (the one-way latency from the source to the destination plus the one-way latency from the destination back to the source). Networks with a longer delay or lag have higher latency, while networks with faster response times have lower latency. Latency can be influenced by various factors such as network congestion, the physical distance between the user and the user plane function, the processing capabilities of the user plane function, and/or the quality of the network infrastructure. However, high latency can lead to slower data transmission, increased buffering times, and a degraded user experience.

BRIEF DESCRIPTION OF THE DRAWINGS

Detailed descriptions of implementations of the present invention will be described and explained through the use of the accompanying drawings.

Figure 1:
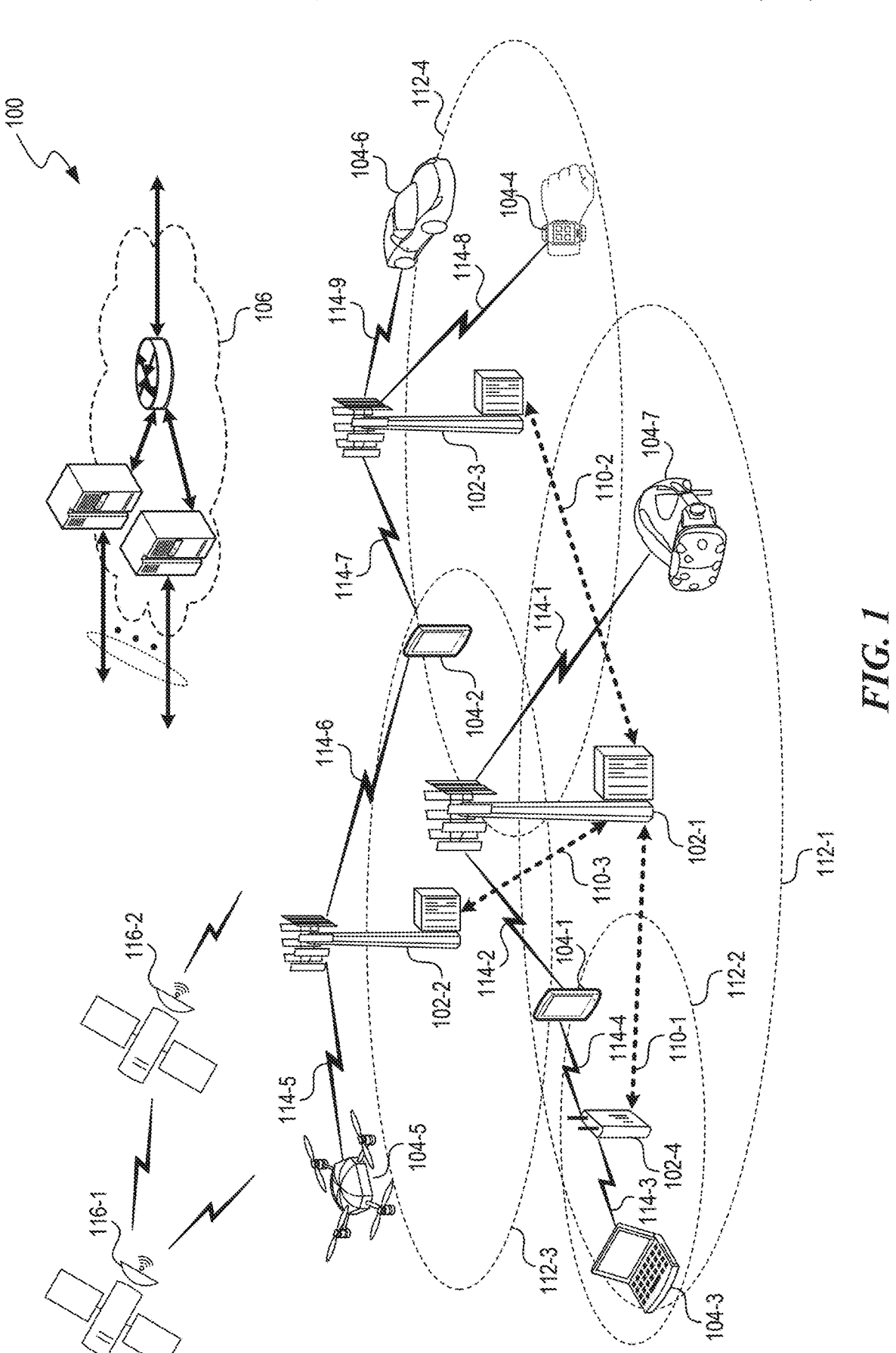
FIG. 1 is a block diagram that illustrates a wireless communications system that can implement aspects of the present technology.

The technologies described herein will become more apparent to those skilled in the art from studying the Detailed Description in conjunction with the drawings. Implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Latency anomalies in user plane functions within core networks represent unexpected and often sporadic increases in the time taken for data packets to travel from the source to the destination (and sometimes also back) within the core network of a wireless communication system. The latency anomalies can arise from various sources, such as network congestion, increased physical distance between the user and the user plane function, hardware failures, inefficient routing, or software bugs. The latency issues can lead to degraded performance of applications, increased buffering times, and overall poor user experience, particularly for latency-sensitive applications like video streaming, online gaming, and real-time communications. As networks evolve to support more complex services and higher data rates, the ability to quickly and accurately detect and resolve latency anomalies in user plane functions becomes increasingly important to maintain service quality and user satisfaction.

Conventional methods of monitoring and managing network performance may fall short in identifying and diagnosing the root causes of latency spikes, which can significantly degrade the quality of service for end users. For example, conventional methods for managing latency anomalies may rely on manual monitoring and rule-based systems, which include network administrators setting predefined thresholds for latency metrics and manually analyzing traffic data to identify deviations. When anomalies are detected, the process of diagnosing and resolving the root causes may be time-consuming and labor-intensive. Conventional methods are often reactive, addressing issues only after they have impacted network performance, leading to prolonged periods of degraded service quality. Furthermore, the scalability of conventional approaches may be limited due to the time-consuming and labor-intensive nature of the approach, making it challenging to manage the increasing volume and diversity of traffic in contemporary networks. As a result, conventional methods may struggle to keep pace with the demands of latency-sensitive applications and thus may negatively affect user experience and satisfaction.

This document discloses methods, apparatuses, and systems that detect, analyze, and/or mitigate latency anomalies in user plane functions within core networks. By continuously monitoring traffic data across multiple markets, the disclosed systems can measure network latencies and identify patterns that deviate from expected performance metrics. For example, a first machine learning model can be used to identify multiple traffic patterns from the traffic data. The traffic patterns can correspond to one or more anomalies in the network latency of the core network. A second machine learning model can be selected from multiple models based on the multiple models' respective query runtimes. The second model can be used to determine one or more user plane function events causing the anomalies and identify portions of the traffic data that include the anomalies.

In some implementations, the disclosed methods can be used to further generate actions (e.g., reconfiguration commands) transmitted to the core network to adjust one or more routing policies of the user plane function based on the determined events. The reconfiguration command can, for example, align the network latency with the multiple training patterns. Furthermore, the disclosed system can trigger alarms when user plane function events meet predetermined criteria. The machine learning models used can be anomaly detection models, forecasting models, and/or trend detection models. For example, the disclosed systems can include an anomaly detection model that identifies outliers within the traffic data, a forecasting model that predicts future trends associated with latencies, and/or a trend detection model that identifies expected traffic patterns using future trends, outliers, and historical data.

In contrast to conventional methods, the disclosed system can continuously monitor traffic data across multiple markets and dynamically evaluate detected anomalies to determine their root causes. Further, when anomalies are detected, the system can automatically implement changes to align traffic data with expected latency patterns (e.g., routing the data to a different user plane function), thereby mitigating issues before they escalate. The automated generation and execution of corrective actions, along with the triggering of alarms when specific criteria are met, proactively manage network performance and reduce the risk of prolonged issues to ensure high-quality service.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 602.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces for LTE) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., Xn interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a non-terrestrial network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QoS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
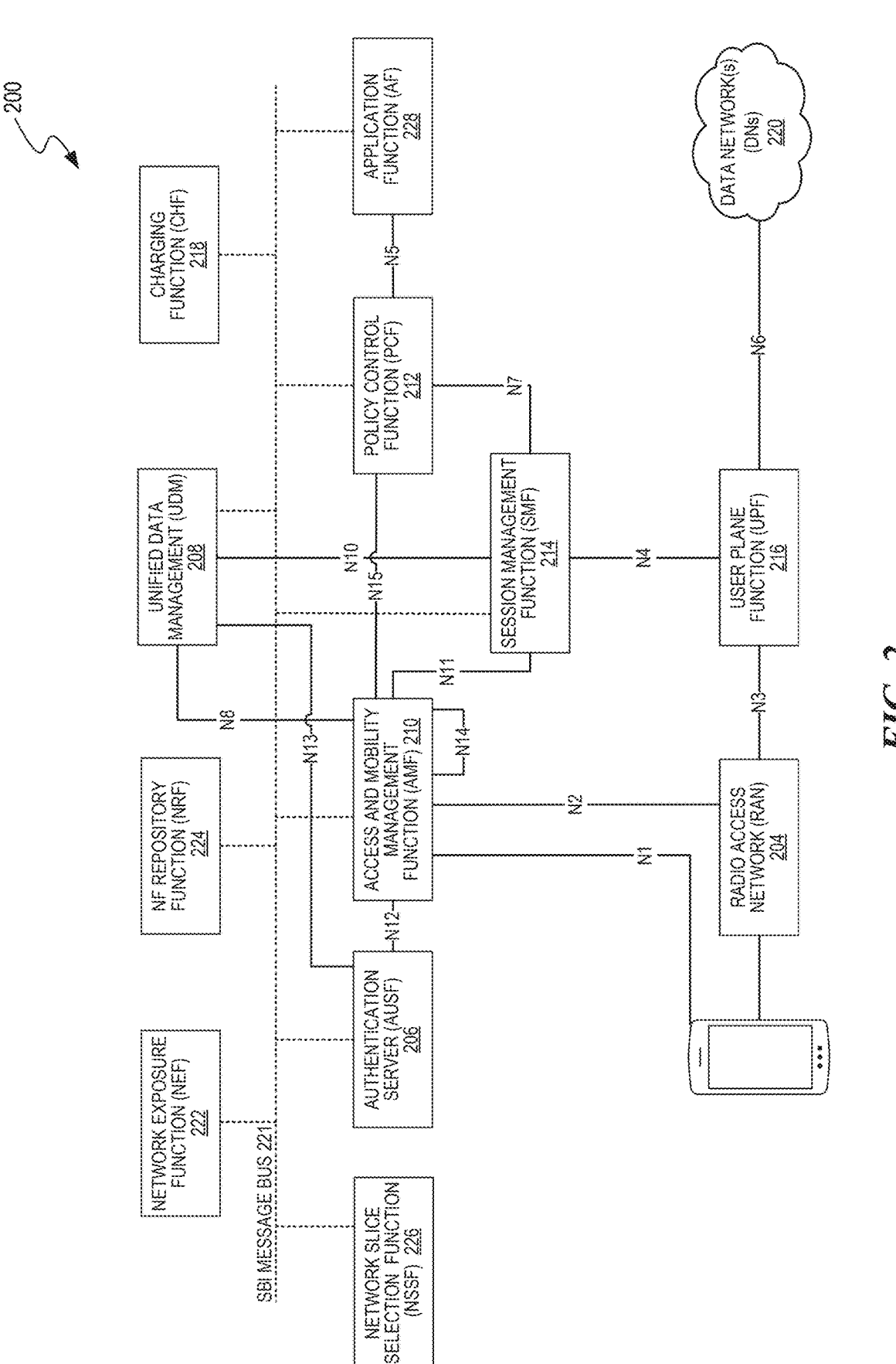
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a user plane function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has predetermined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Figure 3:
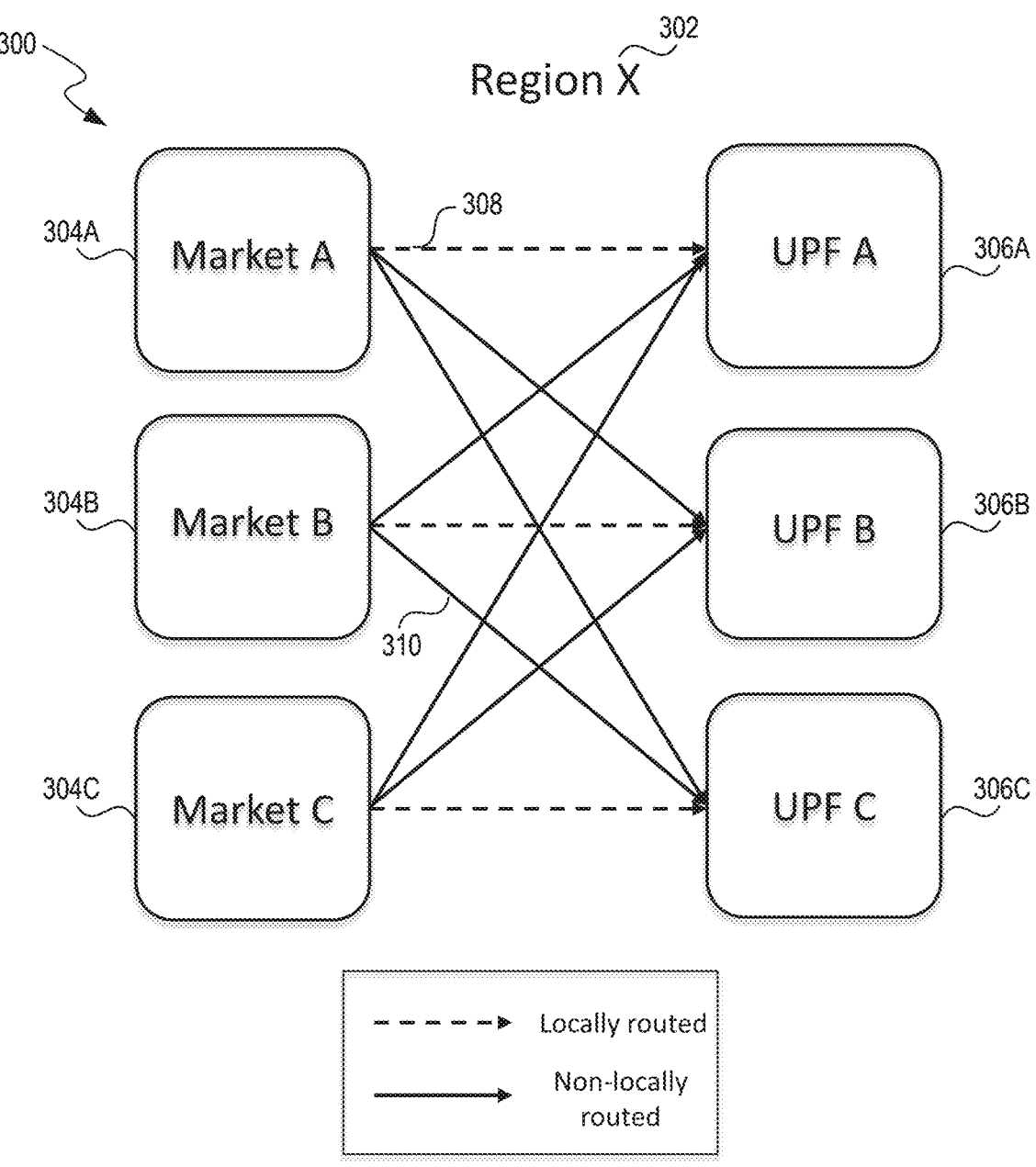
FIG. 3 is a block diagram illustrating an example wireless communications system with a mesh market to user plane function configuration.

Artificial Intelligence-Based Latency Anomaly Detection in the Communications System FIG. 3 is a block diagram illustrating an example wireless communications system 300 with a mesh market to UPF configuration. The wireless communications system 300 represents a region 302 (e.g., "Region X" in FIG. 3) serviced by the network. The wireless communications system 300 of the region 302 includes markets 304, UPFs 306, locally routed traffic 308, and non-locally routed traffic 310 of the network. The network is the same as or similar to network 100, illustrated and described in more detail with reference to FIG. 1. Implementations of example wireless communications system 300 can include different and/or additional components or can be connected in different ways.

The region 302 can be thought of as a geographical area serviced by the network. The region 302 can be divided into one or more markets 304, each representing a specific geographical area where network services are provided. A market 304 can be thought of as a localized segment within the broader region 302 where the network's performance and user experience are monitored and managed. Each market 304 is managed by one or more UPFs 306. UPFs 306 are the same as or similar to UPFs 216 illustrated and described in more detail with reference to FIG. 2. UPFs 306 can manage traffic data and perform tasks such as routing user data packets, managing session states, and/or enforcing QoS policies. Each UPF 306 can manage data traffic for one or more markets 304.

Market traffic is typically routed to the closest UPF in a mesh market to UPF configuration. Locally routed traffic 308 refers to data packets that are processed and forwarded within the same geographical area or network segment. For instance, as depicted in FIG. 3, traffic originating from market A 304A would be routed to UPF A 306A, since UPF A 306A is geographically closest to market A. Similarly, traffic from market B 304B would be routed to UPF B 306B, and traffic from market C 304C would be routed to UPF C 306C. Local routing typically results in lower latency, as the data does not need to travel through multiple network nodes or across long distances. However, due to mobility procedures, such as when users move from one market to another, traffic may be served by non-local UPFs. Non-locally routed traffic 310 includes data packets transmitted between UPFs 306 and market 304 and located in different geographical areas or network segments. For example, if a user moves from market A to market B, the user's traffic may be temporarily routed through UPF B 306B instead of UPF A 306A. Additionally, planned activities such as maintenance or upgrades, as well as unexpected network outages, can also cause traffic to be rerouted to non-local UPFs. For instance, if UPF A 306A undergoes maintenance, traffic from market A 304A may be rerouted to UPF B 306B or UPF C 306C to maintain service continuity. Non-local routing requires the data to traverse additional network nodes and longer distances, typically leading to increased latency.

The wireless communications system 300 can continuously monitor and evaluate traffic data and latency metrics across the markets 304 and UPFs 306. Traffic data is collected from each UPF 306, which can include various metrics such as latency (i.e., the time taken for data to travel from the source to the destination), traffic volume (i.e., amount of data being transmitted through the network), and other performance indicators (e.g., packet loss, jitter, throughput, and so forth). The data can be collected over multiple markets 304 within the region 302. Changes in latencies indicated by the traffic data can be measured using methods discussed with reference to FIG. 4 and FIG. 5.

Figure 4:
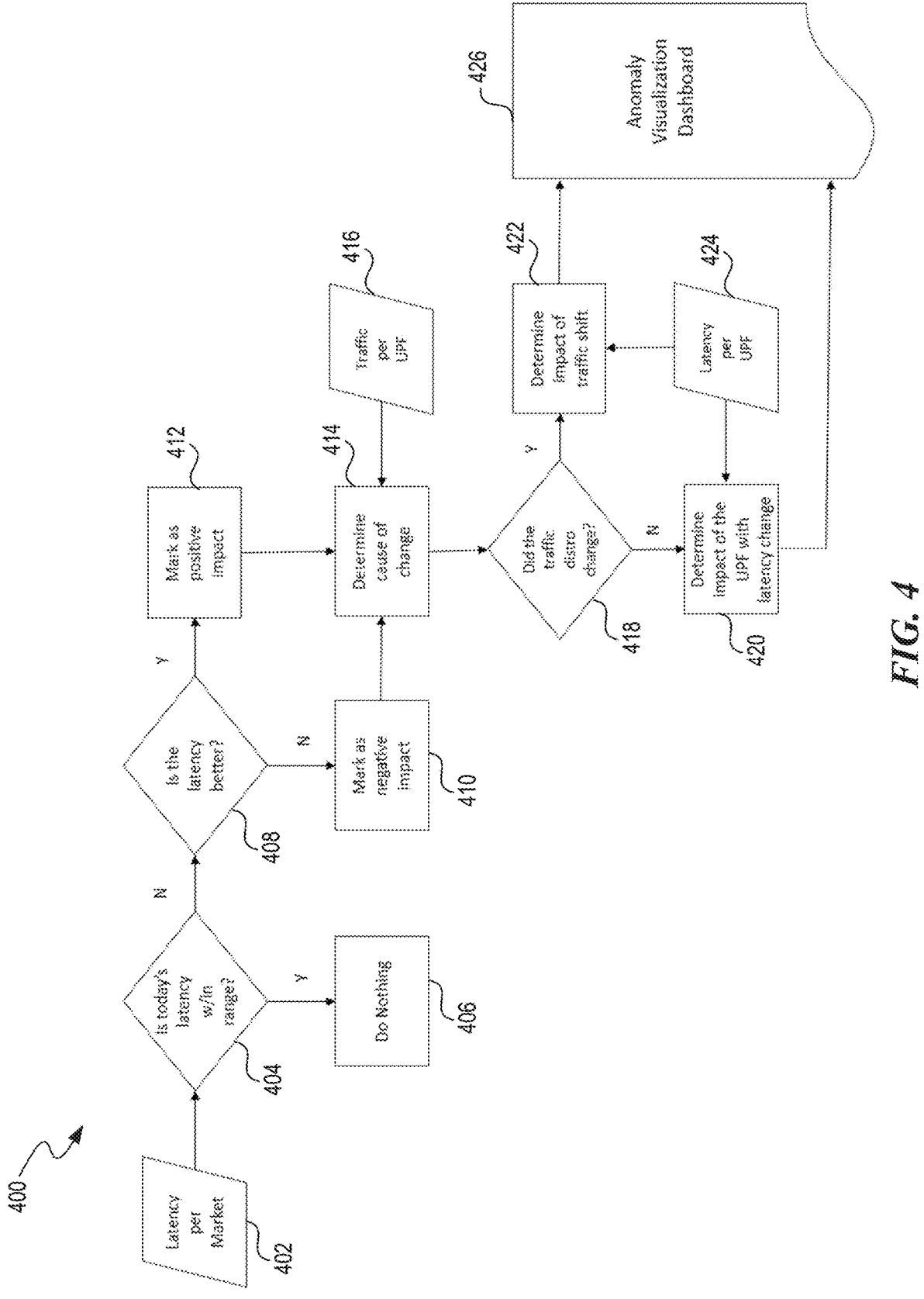
FIG. 4 is a flowchart that illustrates a process for detecting anomalies in the market to user plane function configuration.

FIG. 4 is a flowchart that illustrates a process 400 for detecting anomalies in the market to user plane function configuration performed by a computer system in accordance with aspects of the present technology. In some implementations, the process 400 is performed by a system including components of the example computer system 700 illustrated and described in more detail with reference to FIG. 7. The system can be implemented on a terminal device (e.g., wireless devices 104-1 through 104-7 in FIG. 1), a server, or on a telecommunications network core. Implementations can include different and/or additional operations or can perform the operations in different orders.

In operation 402, the system obtains latency data for each market (e.g., markets 304 in FIG. 3). For example, latency data can include traffic data indicating the time taken for data to travel from the source to the destination within a specific market (i.e., a latency metric). The system can use network monitoring tools such as Simple Network Management Protocol (SNMP), NETFLOW, and/or other network telemetry protocols to collect latency metrics from various network nodes and endpoints within each market. Traffic data can be obtained from the UPF's data records and/or logs generated by the UPF. The logs can capture various metric values and data points about the traffic managed by the UPF, including packet counts, byte counts, session durations, and/or latency measurements. The system can use Application Programming Interfaces (APIs) provided by the UPF to extract event data records, or usage records generated by the UPF on flow termination, at regular intervals. In some implementations, the system may use streaming data platforms such as APACHE KAFKA to ingest event data records in real time, enabling near real-time processing and analysis of the data. In some implementations, specialized software agents can be deployed on network devices (e.g., wireless devices 104-1 through 104-7 in FIG. 1) to gather latency-related data of the network device in near real time. In some implementations, the latency data is used by one or more machine learning models discussed in further detail with reference to FIG. 5 and FIG. 6 on a per-market level (e.g., markets 304 in FIG. 3) to identify the normal trends within the latency data and flag anomalies in the latency data.

The collected data can be stored in a centralized database or data warehouse, such as SQL databases (e.g., MYSQL, POSTGRESQL), NoSQL databases (e.g., MONGODB, CASSANDRA), or cloud-based storage solutions (e.g., AWS S3, GOOGLE CLOUD STORAGE). In some implementations, a time-series database like INFLUXDB or PROMETHEUS can be used to query time-stamped latency data. In some implementations, the latency data can be preprocessed to remove any anomalies or outliers that could skew the analysis by filtering out incomplete or corrupted data entries, normalizing data formats, and/or aggregating data at predefined time intervals.

The collected data can be evaluated in operation 404 to determine if the detected latency is within the expected range based on historical data and predefined thresholds. For example, the system can compare the current latency metrics against historical averages and standard deviations to identify a set of deviations beyond a predetermined threshold. In some implementations, machine learning models can be used to predict expected latency ranges based on historical patterns and trends and identify anomalies (e.g., machine learning models discussed with reference to FIG. 5 and FIG. 6). If the latency is within a predefined range, the process 400 continues to operation 406, where no further action is taken, indicating that the network is performing as expected.

Conversely, if the latency is not within the expected range, the process 400 continues to operation 408, where the system determines if the latency has improved (e.g., latency metric value has decreased) or worsened (e.g., latency metric value has increased) compared to previous measurements. The system can compare the current latency metrics to those from previous time periods to identify any trends or changes. If the latency has not improved, operation 410 can indicate the change as a negative impact, indicating a potential issue that needs to be addressed. Conversely, if the latency has improved, operation 412 can indicate the change as a positive impact, suggesting an improvement in network performance.

Regardless of whether the impact is positive or negative, operation 414 can determine the cause of the change in latency. The change in latency can be caused by traffic shifts and/or specific events in the UPF serving the traffic. Traffic shifts refer to changes in the flow of data traffic, such as rerouting due to mobility or network issues. Specific events in the UPF, such as overloads, failures, or maintenance activities, can further impact latency. The system can monitor traffic patterns and UPF events using network telemetry and logging tools. For example, the system can use SNMP traps or syslog messages to capture UPF events and correlate them with traffic data to identify potential causes of latency changes.

In some implementations, the system may use machine learning models (e.g., machine learning models discussed with reference to FIG. 5 and FIG. 6) to predict the impact of traffic shifts and UPF events on latency, enabling proactive management of network performance. In some implementations, the system can use historical data to train machine learning models that capture the normal behavior of traffic and latency patterns at both the UPF and/or market levels. The machine learning model can be trained to capture the characteristics of traffic and latency patterns, such as average latency, peak latency, traffic volume, and traffic distribution across different UPFs. For example, the machine learning model can learn to identify normal patterns and trends in the data, enabling them to detect anomalies that deviate from these patterns. In some implementations, the system may use ensemble learning techniques to combine the predictions of multiple models.

In some implementations, in operation 416, the system obtains traffic data for each UPF, which includes metrics such as traffic volume and distribution (e.g., number of packets transmitted and received, the volume of data in bytes, and the distribution of traffic across different network paths and endpoints) to help determine the cause of the change of latency in operation 414. In some implementations, the system can use one or more machine learning models (e.g., models in FIG. 5 and FIG. 6) that intake, as input, the division of traffic across various network segments and UPFs to identify the normal patterns and behaviors under typical network conditions and the cause of the anomaly detected in operation 404.

In some implementations, the system can use deep packet inspection (DPI) to gather detailed traffic data and identify specific applications or services contributing to the traffic load. "DPI" refers to examining the contents of data packets as they pass through the network, enabling the system to identify the types of applications, protocols, and services being used. For example, DPI can identify whether the traffic is primarily from video streaming services, file transfers, web browsing, or other types of applications. By correlating the DPI information with latency metrics, the system can determine if certain applications or services are causing increased latency. To implement DPI, the system can deploy DPI engines or appliances at particular points in the network, such as at the UPF itself or at network gateways. The DPI engines can evaluate the packet headers and payloads in near real time, classifying the traffic based on predefined signatures and heuristics such as the presence of particular Hypertext Transfer Protocol (HTTP) headers in the packet payload, the use of particular ports and/or handshake messages for Hypertext Transfer Protocol Secure (HTTPS) traffic, and other indicators of particular applications or services.

Operation 418 evaluates whether the traffic distribution has changed by identifying shifts in traffic patterns, such as changes in the volume of traffic handled by different UPFs or changes in the distribution of traffic across different network paths. If there are no changes beyond a certain threshold in traffic distribution, the process 400 proceeds to operation 420, where the system determines the impact of the UPF on the latency change by evaluating how the performance of the UPF, such as its processing capacity or load, may have contributed to the observed latency anomaly.

If there is a significant change in traffic distribution (e.g., change exceeding the certain threshold), operation 422 can determine the impact of the traffic shift on the latency to, for example, identify how changes in traffic routing and load balancing may have affected network performance. The system can identify the impact by measuring how changes in traffic routing, such as rerouting traffic through different paths, and load balancing, such as uneven distribution of traffic across UPFs, have contributed to the observed latency changes.

In operation 424, the system obtains latency data for each UPF, and uses time-series analysis and/or machine learning models (e.g., models in FIG. 5 and FIG. 6), to identify patterns and trends in the latency data and identify the cause of the anomaly. In operation 426, the system can present, on an anomaly visualization dashboard, the consolidated findings from operation 420 and operation 422. The anomaly visualization dashboard can visually represent the anomalies, the anomalies' impacts, and the underlying causes to enable network operators to quickly identify and address issues to maintain network performance. In some implementations, the visualization dashboard can include real-time alerts in response to detecting an anomaly.

Figure 5:
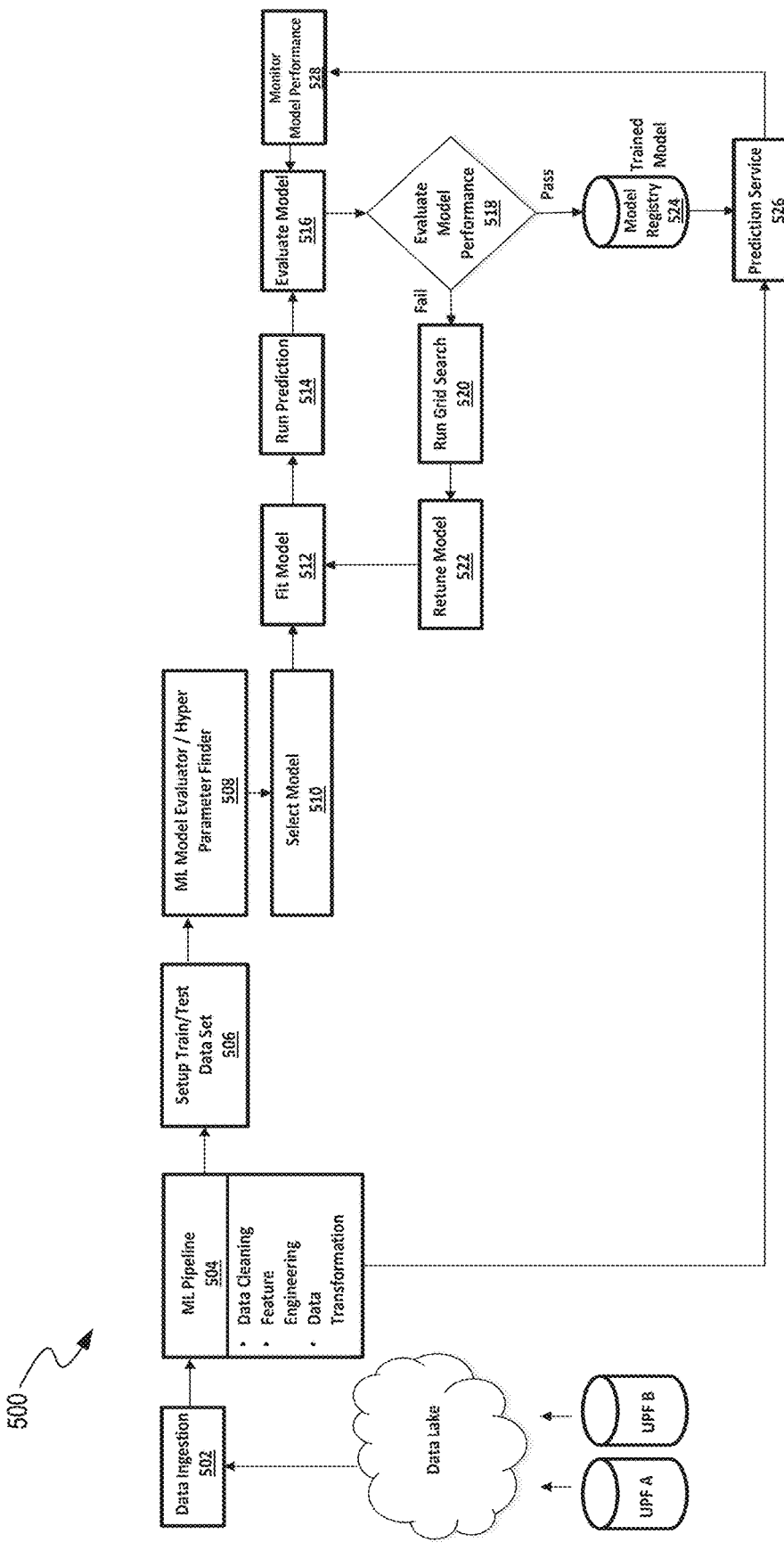
FIG. 5 is a flowchart that illustrates a process for constructing a machine learning model to detect anomalies in the market to user plane function configuration.

FIG. 5 is a flowchart that illustrates a process 500 for constructing a machine learning model to detect anomalies in the market to user plane function configuration performed by a computer system in accordance with aspects of the present technology. In some implementations, the process 500 is performed by a system including components of the example computer system 700 illustrated and described in more detail with reference to FIG. 7. The system can be implemented on a terminal device (e.g., wireless devices 104-1 through 104-7 in FIG. 1), a server, or on a telecommunications network core. Implementations can include different and/or additional operations or can perform the operations in different orders.

In operation 502, the system can ingest data from a datastore, data lake, or a centralized repository connected to UPFs. The data ingested includes various metrics and logs from the UPFs, such as date and time of the data capture, the specific market or geographical region the UPF is serving, the latency experienced by the traffic passing through the UPF, and the percentage of traffic the gateway is handling for a particular market associated with the UPF, and error rates (e.g., traffic data in FIG. 4). The data can be ingested in various formats such as CSV, JSON, PARQUET, OR AVRO, depending on the nature of the data and the requirements of the downstream processing operations. In some implementations, the ingested data includes historical latency and traffic data from various markets and UPFs, along with labels indicating whether an anomaly was detected and/or the cause of the anomaly. In some implementations, the data includes near real time traffic data discussed with reference to FIG. 3 and FIG. 4.

Operation 504 processes the ingested data from operation 502 using data cleaning, feature engineering, and/or data transformations. Data cleaning includes removing any anomalies, duplicates, or missing values that could skew the analysis. Feature engineering includes creating new features from the raw data that capture the underlying patterns and relationships. For example, the system can aggregate traffic volume over different time windows and/or calculate the rate of change in latency, average latency, peak latency, and/or latency distribution over time. Data transformations include normalizing or scaling the data (e.g., into a numerical value)

to ensure that the data is in a format usable for machine learning that the machine learning model(s) used in other operations.

In operation 506, the system can set up the train and test dataset by splitting the preprocessed data into training and testing sets, such as using an 80/20 or 70/30 split. The training set can be used to train the machine learning model, while the testing set can be used to evaluate its performance. In some implementations, stratified sampling can be used to ensure that the training and testing sets have similar distributions of one or more variables to maintain the representativeness of the one or more variables in the data. Additionally, cross-validation techniques such as k-fold cross-validation can be used to further validate the model's performance and ensure that the model is enabled to generalize to unseen data.

Operation 508 applies a machine learning model evaluator and hyperparameter finder by selecting a range of machine learning algorithms and tuning their hyperparameters to identify the best-performing model. In some implementations, the machine learning model is an anomaly detection model, a forecasting model, and/or a trend detection model. The anomaly detection model can identify one or more outliers within the traffic data, the forecasting model can predict one or more future trends associated with the latencies over the multiple markets within the core network based on the traffic data and the one or more outliers, and the trend detection model can identify one or more patterns that indicate expected traffic data using the one or more future trends, the one or more outliers, and historical traffic data.

The model evaluator can assess the performance of each model using cross-validation techniques to ensure that the selected model generalizes to unseen data. The evaluation metrics used to assess the models can include query runtime, accuracy, precision, recall, F1-score, and/or area under the curve (AUC). Query runtime measures the time taken for a model to process a given query and return a result, which can be used for real-time applications where quick response times are important. Query runtime can be measured by execution time, memory usage, and/or computational efficiency of the model. Additionally, accuracy measures the proportion of correctly predicted instances out of the total instances. Precision, also known as the positive predictive value, calculates the ratio of true positive predictions to the total predicted positives and can indicate the model's ability to avoid false positives. Recall, or sensitivity, measures the ratio of true positive predictions to the total actual positives, which can indicate the model's ability to capture all relevant instances. The F1-score is the harmonic mean of precision and recall. Further, the AUC evaluates the model's ability to distinguish between classes by plotting the true positive rate against the false positive rate, with a higher AUC indicating better performance.

In operation 510, the system selects the best-performing model based on the evaluation metrics from operation 508 by, for example, comparing the performance of different models and selecting the one with the lowest query runtime and/or the highest accuracy, precision, recall, or other relevant metrics. The selected model can be used for further training and evaluation. In some implementations, ensemble methods such as stacking, bagging, or boosting can be used to combine the strengths of multiple models and improve overall performance. For example, the system can train multiple base models (e.g., decision trees, support vector machines, neural networks) and use a meta-model to combine the base models' predictions. The system can train multiple instances of the same model on different subsets of the training data. In some implementations, each base model can be configured to correct the errors made by the previously trained base models (e.g., by assigning more weight to the misclassified or poorly predicted instances).

In some implementations, to choose the best model, the system can use a cluster-based function (CB function) that simulates the central processing unit (CPU) time required for each model to process the data and estimates the model's accuracy. The CB function can place each candidate model against a trained benchmark model, running simulations to determine the hyperparameters that decrease query runtime while increasing accuracy. For example, the system can train each candidate model on a representative dataset and use the CB function to simulate the model's performance on a cluster of CPUs by measuring the time taken for each model to process a specific dataset. By iteratively adjusting the hyperparameters, such as learning rate, regularization strength, and the number of layers or trees, the CB function can identify the configuration that offers a balance between performance and efficiency. For example, the CB function can determine that increasing the number of trees in a gradient-boosting model improves accuracy but also increases query runtime, and the CB function may seek a balance that provides sufficient accuracy without excessive computational cost.

Operation 512 fits the selected model to the training data by training the model on the training set to identify the underlying patterns and relationships in the data. In some implementations, techniques such as early stopping, regularization, or dropout can be applied during training to prevent overfitting and improve the model's generalization capabilities. In operation 514, the system can run predictions using the trained model to generate predictions on the unseen testing data. The predictions can be compared to the actual values to evaluate the model's performance. In some implementations, additional techniques such as confidence intervals or prediction intervals can be used to quantify the uncertainty of the predictions and provide more robust insights into the model's performance. For example, the model can output a prediction indicating whether the observed data represents normal behavior or an anomaly. The model might predict expected latency values and traffic distribution for each UPF node based on historical data and current network conditions. The anomaly predictions can be categorized as −1, 0, or 1, where −1 indicates an improvement, 0 indicates no significant change, and 1 indicates a degradation in performance.

In some implementations, the system trains the model to identify the cause of the anomaly (e.g., user plane function events) by analyzing the specific metrics that contributed to the deviation/anomaly. For example, the system compares the values ingested in operation 502 and transformed by operation 504 with the expected values generated by the model. If the observed latency deviates from the predicted range (or beyond a certain threshold), the system can flag the instance as an anomaly. Further, a sudden spike in traffic volume can indicate network congestion, which may be causing the increased latency. The system can identify traffic patterns to determine if there has been an unusual influx of data from a specific market or application. Additionally, the system can identify any recent changes in traffic routing or load balancing configurations. The system correlates the metrics with other network performance indicators, such as packet loss rates, jitter, and throughput, to identify any signs of hardware malfunctions or degraded network links. Further, the system can consider external factors such as market conditions (e.g., increased user activity during peak hours or special events could impact network performance). Thus, the system can pinpoint whether the anomaly is due to network congestion, hardware issues, inefficient routing, or other factors.

Operation 516 evaluates the model's performance using various metrics such as accuracy, precision, recall, F1-score, and AUC by calculating the metrics to assess how well the model is performing on the testing data. In some implementations, additional evaluation techniques such as confusion matrices, receiver operating characteristic (ROC) curves, or precision-recall curves can be used to provide a more comprehensive assessment of the model's performance.

Operation 518 evaluates the model's performance against predefined thresholds. If the model's performance meets or exceeds the thresholds, the process 500 can proceed to operation 524. If the performance fails to meet the thresholds, operation 520 can execute a grid search to further tune the model's hyperparameters by exploring a wider range of hyperparameters. During a grid search, the system can define a grid of hyperparameter values to be tested. Each point in this grid can represent a unique combination of hyperparameters. The model can be trained and evaluated for each combination using a performance metric such as accuracy, precision, recall, F1-score, and/or AUC. For example, if the grid includes three different learning rates and four different values for the number of layers, the grid search can evaluate the model for 12 combinations of these hyperparameters.

In operation 522, the system retunes the model based on the results of the grid search by updating the model's hyperparameters with the updated parameters found in operation 520 and retraining the model on the training data. The retuned model can be reevaluated in operation 516 to ensure that the performance has improved. If the model's performance passes the evaluation in operation 518, the trained model can be stored in a model registry in operation 524 by saving the model's parameters, hyperparameters, and evaluation metrics in a centralized repository for future reference and deployment. In some implementations, additional metadata such as the model's training data, version history, and performance metrics can be stored in the registry to provide a record of the model's development and deployment.

In operation 526, the prediction service can use new incoming data transformed in operation 504 to monitor model performance by deploying the trained model to a production environment and continuously monitoring the trained model's performance on new data. The prediction service can generate predictions in near real time. Operation 528 can continuously evaluate the model's performance in a feedback loop of the system. For example, the system can periodically retrain the model on new data, reevaluate its performance, and update the model's parameters using methods discussed with reference to operations 512 to 522.

In some implementations, the system can generate one or more actions (e.g., reconfiguration commands) transmitted to the core network to adjust one or more routing policies of the user plane function based on the determined events. The reconfiguration command can, for example, align the network latency with the multiple training patterns. For example, the system can generate the one or more actions using predefined rules/policies and/or machine learning models trained on historic anomalies and actions to identify actions that were effective in the past for similar anomalies. For example, if the system identifies that a particular UPF is experiencing high latency due to network congestion, the system can generate actions to redistribute the traffic load evenly across other UPF. The system can adjust the routing policies to divert some of the traffic to less congested nodes or modify the load-balancing algorithms to ensure a more equitable distribution of traffic. In cases where the anomaly is due to hardware issues, the system can generate actions to reroute traffic away from the affected hardware components by dynamically updating the routing tables to bypass the faulty hardware or initiating failover procedures to switch to backup components. Once the appropriate actions are determined, the system can automatically execute the one or more actions using one or more automatic workflows using APIs that allow the system to interact with the network infrastructure. In some implementations, the system can be caused to trigger one or more alarms when the one or more user plane function events satisfy one or more predetermined criteria. For example, if the network congestion causes the latency to exceed a predefined threshold, the system can flag the network congestion event through a triggered alarm.

AI System

Figure 6:
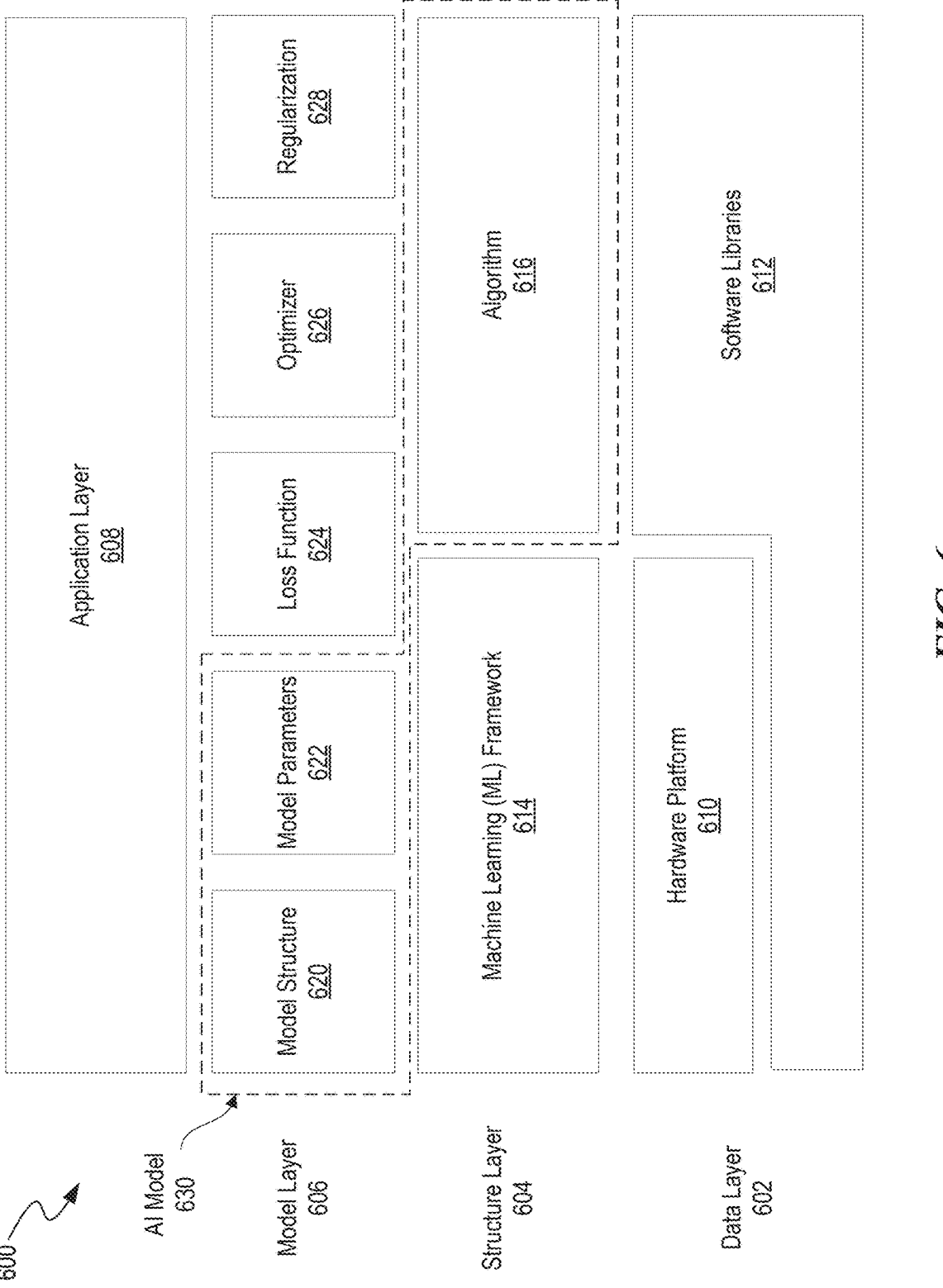
FIG. 6 is a high-level block diagram illustrating an example artificial intelligence system.

FIG. 6 is a block diagram illustrating an example artificial intelligence (AI) system 600, in accordance with one or more implementations of this disclosure. The AI system 600 is implemented using components of the example computer system 700 illustrated and described in more detail with reference to FIG. 7. For example, the AI system 600 can be implemented using the processor 702 and instructions 708 programmed in the memory 706 illustrated and described in more detail with reference to FIG. 7. Likewise, implementations of the AI system 600 can include different and/or additional components or be connected in different ways.

As shown, the AI system 600 can include a set of layers, which conceptually organize elements within an example network topology for the AI system's architecture to implement a particular AI model 630. Generally, an AI model 630 is a computer-executable program implemented by the AI system 600 that analyzes data to make predictions. Information can pass through each layer of the AI system 600 to generate outputs for the AI model 630. The layers can include a data layer 602, a structure layer 604, a model layer 606, and an application layer 608. The algorithm 616 of the structure layer 604 and the model structure 620 and model parameters 622 of the model layer 606 together form the example AI model 630. The optimizer 626, loss function engine 624, and regularization engine 628 work to refine and optimize the AI model 630, and the data layer 602 provides resources and support for application of the AI model 630 by the application layer 608.

The data layer 602 acts as the foundation of the AI system 600 by preparing data for the AI model 630. As shown, the data layer 602 can include two sub-layers: a hardware platform 610 and one or more software libraries 612. The hardware platform 610 can be designed to perform operations for the AI model 630 and include computing resources for storage, memory, logic, and networking, such as the resources described in relation to FIG. 7. The hardware platform 610 can process amounts of data using one or more servers. The servers can perform backend operations such as matrix calculations, parallel calculations, machine learning (ML) training, and the like. Examples of servers used by the hardware platform 610 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but can be used for AI applications due to their vast computing and memory resources. GPUs use a parallel structure that generally makes their processing more efficient than that of CPUs. In some instances, the hardware platform 610 can include Infrastructure as a Service (IaaS) resources, which are computing resources, (e.g., servers, memory, etc.) offered by a cloud services provider. The hardware platform 610 can also include computer memory for storing data about the AI model 630, application of the AI model 630, and training data for the AI model 630. The computer memory can be a form of random-access memory (RAM), such as dynamic RAM, static RAM, and non-volatile RAM.

The software libraries 612 can be thought of as suites of data and programming code, including executables, used to control the computing resources of the hardware platform 610. The programming code can include low-level primitives (e.g., fundamental language elements) that form the foundation of one or more low-level programming languages, such that servers of the hardware platform 610 can use the low-level primitives to carry out specific operations. The low-level programming languages do not require much, if any, abstraction from a computing resource's instruction set architecture, allowing them to run quickly with a small memory footprint. Examples of software libraries 612 that can be included in the AI system 600 include Intel Math Kernel Library, Nvidia cuDNN, Eigen, and Open BLAS.

The structure layer 604 can include a machine learning (ML) framework 614 and an algorithm 616. The ML framework 614 can be thought of as an interface, library, or tool that allows users to build and deploy the AI model 630. The ML framework 614 can include an open-source library, an application programming interface (API), a gradient-boosting library, an ensemble method, and/or a deep learning toolkit that work with the layers of the AI system facilitate development of the AI model 630. For example, the ML framework 614 can distribute processes for application or training of the AI model 630 across multiple resources in the hardware platform 610. The ML framework 614 can also include a set of pre-built components that have the functionality to implement and train the AI model 630 and allow users to use pre-built functions and classes to construct and train the AI model 630. Thus, the ML framework 614 can be used to facilitate data engineering, development, hyperparameter tuning, testing, and training for the AI model 630.

Examples of ML frameworks 614 or libraries that can be used in the AI system 600 include TENSORFLOW, PYTORCH, SCIKIT-LEARN, KERAS, AND CAFFFE. Random Forest is a machine learning algorithm that can be used within the ML frameworks 614. LightGBM is a gradient boosting framework/algorithm (an ML technique) that can be used. Other techniques/algorithms that can be used are XGBoost, CatBoost, etc. AMAZON WEB SERVICES is a cloud service provider that offers various machine learning services and tools (e.g., Sage Maker) that can be used for platform building, training, and deploying ML models.

In some implementations, the ML framework 614 performs deep learning (also known as deep structured learning or hierarchical learning) directly on the input data to learn data representations, as opposed to using task-specific algorithms. In deep learning, no explicit feature extraction is performed; the features of feature vector are implicitly extracted by the AI system 600. For example, the ML framework 614 can use a cascade of multiple layers of nonlinear processing units for implicit feature extraction and transformation. Each successive layer uses the output from the previous layer as input. The AI model 630 can thus learn in supervised (e.g., classification) and/or unsupervised (e.g., pattern analysis) modes. The AI model 630 can learn multiple levels of representations that correspond to different levels of abstraction, wherein the different levels form a hierarchy of concepts. In this manner, AI model 630 can be configured to differentiate features of interest from background features.

The algorithm 616 can be an organized set of computer-executable operations used to generate output data from a set of input data and can be described using pseudocode. The algorithm 616 can include complex code that allows the computing resources to learn from new input data and create new/modified outputs based on what was learned. In some implementations, the algorithm 616 can build the AI model 630 through being trained while running computing resources of the hardware platform 610. This training allows the algorithm 616 to make predictions or decisions without being explicitly programmed to do so. Once trained, the algorithm 616 can run at the computing resources as part of the AI model 630 to make predictions or decisions, improve computing resource performance, or perform tasks. The algorithm 616 can be trained using supervised learning, unsupervised learning, semi-supervised learning, and/or reinforcement learning.

Using supervised learning, the algorithm 616 can be trained to learn patterns (e.g., map input data to output data) based on labeled training data. The training data can be labeled by an external user or operator. For instance, a user can collect a set of training data, such as by capturing application and/or service usage patterns, metadata, historical communication sessions, and the like (detailed further in FIG. 4 and FIG. 5). The user can label the training data based on one or more classes and trains the AI model 630 by inputting the training data to the algorithm 616. The algorithm determines how to label the new data based on the labeled training data. The user can facilitate collection, labeling, and/or input via the ML framework 614. In some instances, the user can convert the training data to a set of feature vectors for input to the algorithm 616. Once trained, the user can test the algorithm 616 on new data to determine if the algorithm 616 is predicting accurate labels for the new data. For example, the user can use cross-validation methods to test the accuracy of the algorithm 616 and retrain the algorithm 616 on new training data if the results of the cross-validation are below an accuracy threshold.

Supervised learning can involve classification and/or regression. Classification techniques involve teaching the algorithm 616 to identify a category of new observations based on training data and are used when input data for the algorithm 616 is discrete. Said differently, when learning through classification techniques, the algorithm 616 receives training data labeled with categories (e.g., classes) and determines how features observed in the training data (e.g., features of data of FIG. 4 and FIG. 5 such as frequency of data transmissions, duration of data sessions, volume of data exchanges, timing of data bursts) relate to the categories (e.g., services and applications). Once trained, the algorithm 616 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques involve estimating relationships between independent and dependent variables and are used when input data to the algorithm 616 is continuous. Regression techniques can be used to train the algorithm 616 to predict or forecast relationships between variables. To train the algorithm 616 using regression techniques, a user can select a regression method for estimating the parameters of the model. The user collects and labels training data that is input to the algorithm 616 such that the algorithm 616 is trained to understand the relationship between data features and the dependent variable(s). Once trained, the algorithm 616 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine-learning based pre-processing operations.

Under unsupervised learning, the algorithm 616 learns patterns from unlabeled training data. In particular, the algorithm 616 is trained to learn hidden patterns and insights of input data, which can be used for data exploration or for generating new data. Here, the algorithm 616 does not have a predefined output, unlike the labels output when the algorithm 616 is trained using supervised learning. Another way unsupervised learning is used to train the algorithm 616 to find an underlying structure of a set of data is to group the data according to similarities and represent that set of data in a compressed format. The wireless communication system 300 disclosed herein can use unsupervised learning to identify patterns in data received.

A few techniques can be used in supervised learning: clustering, anomaly detection, and techniques for learning latent variable models. Clustering techniques involve grouping data into different clusters that include similar data, such that other clusters contain dissimilar data. For example, during clustering, data with possible similarities remain in a group that has less or no similarities to another group. Examples of clustering techniques density-based methods, hierarchical based methods, partitioning methods, and grid-based methods. In one example, the algorithm 616 can be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 616 can be trained to be an Isolation Forest, local outlier factor (LOF) algorithm, or K-nearest neighbor (k-NN) algorithm. Latent variable techniques involve relating observable variables to a set of latent variables. These techniques assume that the observable variables are the result of an individual's position on the latent variables and that the observable variables have nothing in common after controlling for the latent variables. Examples of latent variable techniques that can be used by the algorithm 616 include factor analysis, item response theory, latent profile analysis, and latent class analysis.

In some implementations, the AI system 600 trains the algorithm 616 of AI model 630, based on the training data, to correlate the feature vector to expected outputs in the training data. As part of the training of the AI model 630, the AI system 600 forms a training set of features and training labels by identifying a positive training set of features that have been determined to have a desired property in question, and, in some implementations, forms a negative training set of features that lack the property in question. The AI system 600 applies ML framework 614 to train the AI model 630, that when applied to the feature vector, outputs indications of whether the feature vector has an associated desired property or properties, such as a probability that the feature vector has a particular Boolean property, or an estimated value of a scalar property. The AI system 600 can further apply dimensionality reduction (e.g., via linear discriminant analysis (LDA), PCA, or the like) to reduce the amount of data in the feature vector to a smaller, more representative set of data.

The model layer 606 implements the AI model 630 using data from the data layer and the algorithm 616 and ML framework 614 from the structure layer 604, thus enabling decision-making capabilities of the AI system 600. The model layer 606 includes a model structure 620, model parameters 622, a loss function engine 624, an optimizer 626, and a regularization engine 628.

The model structure 620 describes the architecture of the AI model 630 of the AI system 600. The model structure 620 defines the complexity of the pattern/relationship that the AI model 630 expresses. Examples of structures that can be used as the model structure 620 include decision trees, support vector machines, regression analyses, Bayesian networks, Gaussian processes, genetic algorithms, and artificial neural networks (or, simply, neural networks). The model structure 620 can include a number of structure layers, a number of nodes (or neurons) at each structure layer, and activation functions of each node. Each node's activation function defines how to node converts data received to data output. The structure layers can include an input layer of nodes that receive input data, an output layer of nodes that produce output data. The model structure 620 can include one or more hidden layers of nodes between the input and output layers. The model structure 620 can be an Artificial Neural Network (or, simply, neural network) that connects the nodes in the structured layers such that the nodes are interconnected. Examples of neural networks include Feed-forward Neural Networks, convolutional neural networks (CNNs), Recurrent Neural Networks (RNNs), Autoencoder, and Generative Adversarial Networks (GANs).

The model parameters 622 represent the relationships learned during training and can be used to make predictions and decisions based on input data. The model parameters 622 can weight and bias the nodes and connections of the model structure 620. For instance, when the model structure 620 is a neural network, the model parameters 622 can weight and bias the nodes in each layer of the neural networks, such that the weights determine the strength of the nodes and the biases determine the thresholds for the activation functions of each node. The model parameters 622, in conjunction with the activation functions of the nodes, determine how input data is transformed into desired outputs. The model parameters 622 can be determined and/or altered during training of the algorithm 616.

The loss function engine 624 can determine a loss function, which is a metric used to evaluate the AI model's 630 performance during training. For instance, the loss function engine 624 can measure the difference between a predicted output of the AI model 630 and the actual output of the AI model 630 and is used to guide optimization of the AI model 630 during training to minimize the loss function. The loss function can be presented via the ML framework 614, such that a user can determine whether to retrain or otherwise alter the algorithm 616 if the loss function is over a threshold. In some instances, the algorithm 616 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 626 adjusts the model parameters 622 to minimize the loss function during training of the algorithm 616. In other words, the optimizer 626 uses the loss function generated by the loss function engine 624 as a guide to determine what model parameters lead to the most accurate AI model 630. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 626 used can be determined based on the type of model structure 620 and the size of data and the computing resources available in the data layer 602.

The regularization engine 628 executes regularization operations. Regularization is a technique that prevents over- and under-fitting of the AI model 630. Overfitting occurs when the algorithm 616 is overly complex and too adapted to the training data, which can result in poor performance of the AI model 630. Underfitting occurs when the algorithm 616 is unable to recognize even basic patterns from the training data such that it cannot perform well on training data or on validation data. The regularization engine 628 can apply one or more regularization techniques to fit the algorithm 616 to the training data properly, which helps constraint the resulting AI model 630 and improves its ability for generalized application. Examples of regularization techniques include lasso (L1) regularization, ridge (L2) regularization, and elastic (L1 and L2 regularization).

In some implementations, the AI system 600 can include a feature extraction module implemented using components of the example computer system 700 illustrated and described in more detail with reference to FIG. 7. In some implementations, the feature extraction module extracts a feature vector from input data. The feature vector includes n features (e.g., feature a, feature b, . . . , feature n). The feature extraction module reduces the redundancy in the input data, e.g., repetitive data values, to transform the input data into the reduced set of features such as feature vector. The feature vector contains the relevant information from the input data, such that events or data value thresholds of interest can be identified by the AI model 630 by using this reduced representation. In some example implementations, the following dimensionality reduction techniques are used by the feature extraction module: independent component analysis, Isomap, kernel principal component analysis (PCA), latent semantic analysis, partial least squares, PCA, multifactor dimensionality reduction, nonlinear dimensionality reduction, multilinear PCA, multilinear subspace learning, semi-definite embedding, autoencoder, and deep feature synthesis.

Computer System

Figure 7:
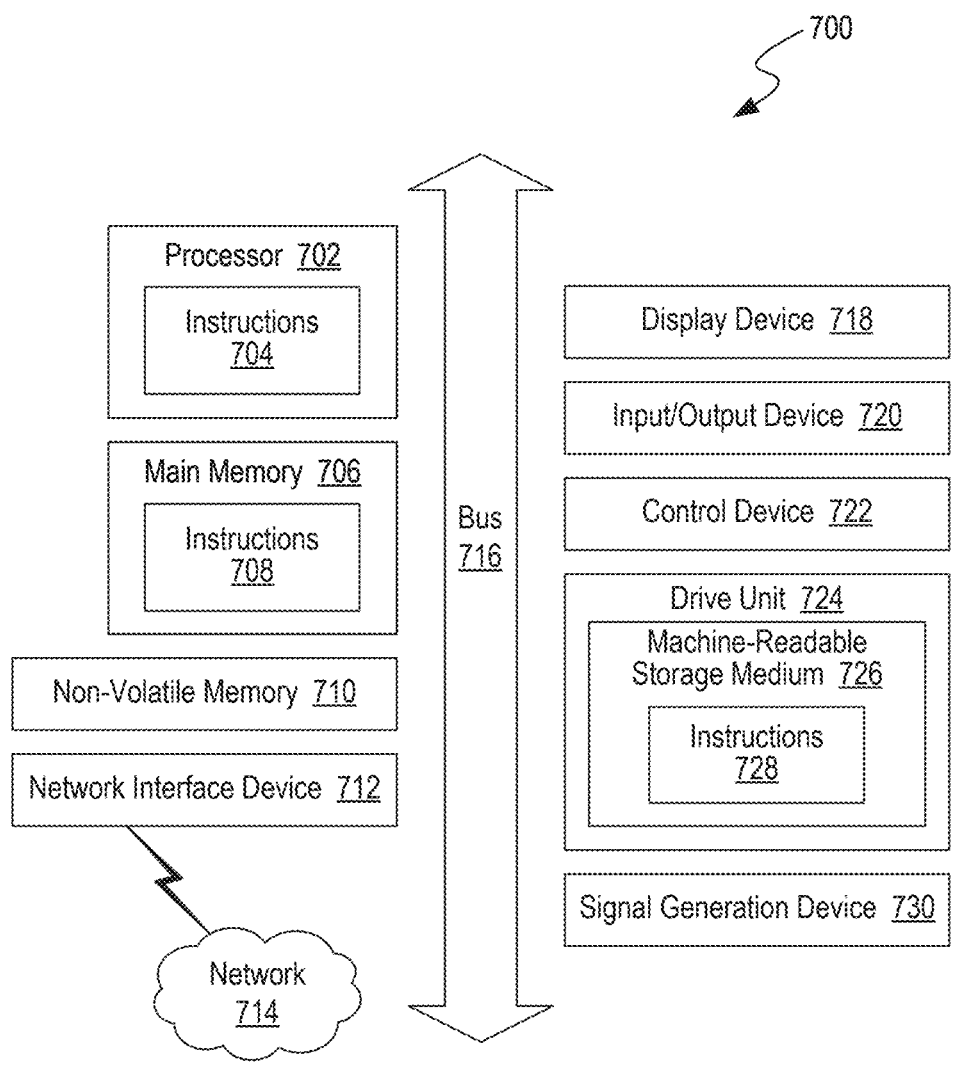
FIG. 7 is a block diagram that illustrates an example of a computer system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, a video display device 718, an input/output device 720, a control device 722 (e.g., keyboard and pointing device), a drive unit 724 that includes a machine-readable (storage) medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computing system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 700. In some implementations, the computer system 700 can be an embedded computer system, a system-on-chip (SOC), a single-board computer system (SBC), or a distributed system such as a mesh of computer systems, or it can include one or more cloud components in one or more networks. Where appropriate, one or more computer systems 700 can perform operations in real time, in near real time, or in batch mode.

The network interface device 712 enables the computing system 700 to mediate data in a network 714 with an entity that is external to the computing system 700 through any communication protocol supported by the computing system 700 and the external entity. Examples of the network interface device 712 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable medium 726 can include any medium that is capable of storing, encoding, or carrying a set of instructions for execution by the computing system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

REMARKS

The terms "example" and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number can also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that can be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A system comprising:
at least one hardware processor; and
at least one non-transitory memory storing instructions, which, when executed by the at least one hardware processor, cause the system to:
obtain traffic data served by a user plane function of a core network;
determine, using a first machine learning model, multiple traffic patterns using the traffic data served by the user plane function,
wherein the multiple traffic patterns correspond to one or more anomalies in a network latency of the core network, and
wherein the first machine learning model is configured using multiple training patterns that correspond to an expected network latency of the core network;
select a second machine learning model from multiple machine learning models using a respective query runtime of each of the multiple machine learning models;

determine, using the second machine learning model, one or more user plane function events causing the one or more anomalies,
wherein the one or more user plane function events is determined using the traffic data, and
wherein the second machine learning model is configured to:
identify a portion of the traffic data that includes the one or more anomalies, and
provide the one or more user plane function events using the portion of the traffic data; and
transmit a reconfiguration command to the core network to adjust one or more routing policies of the user plane function using the determined one or more user plane function events, wherein the reconfiguration command is configured to align the network latency with the multiple training patterns.

2. The system of claim 1, wherein the system is caused to:
form a training dataset by applying at least one of data cleaning, feature engineering, or data transformations to the traffic data; and
train at least one of the first machine learning model or the second machine learning model using the training dataset.

3. The system of claim 1,
wherein the one or more anomalies is a first set of anomalies,
wherein the first machine learning model is configured to generate a second set of anomalies using a change of the network latency, and
wherein the change of the network latency includes changes in one or more of: average latency, peak latency, or latency distribution over time.

4. The system of claim 1,
wherein the system is caused to measure the respective query runtime of each of the multiple machine learning models to process the traffic data, and
wherein the measurement of the respective query runtime is based on one or more of: execution time, memory usage, or computational efficiency of a corresponding model.

5. The system of claim 1, wherein the second machine learning model has a lower query runtime than the respective query runtime of each of the multiple machine learning models.

6. The system of claim 1,
wherein the system is caused to trigger one or more alarms, and
wherein the one or more user plane function events satisfy one or more predetermined criteria.

7. The system of claim 1,
wherein at least one of: the first machine learning model or the second machine learning model is one or more of: an anomaly detection model, a forecasting model, or a trend detection model,
wherein the anomaly detection model is configured to identify one or more outliers within the traffic data,
wherein the forecasting model is configured to predict one or more future trends associated with the network latency within the core network based on the traffic data and the one or more outliers, and
wherein the trend detection model is configured to identify one or more patterns that indicate expected traffic data using the one or more future trends, the one or more outliers, and historical traffic data.

8. A non-transitory, computer-readable storage medium comprising instructions recorded thereon, wherein the instructions when executed by at least one data processor of a computer system, cause the computer system to:

obtain traffic data served by a user plane function of a core network;

determine, using a first machine learning model, multiple traffic patterns using the traffic data served by the user plane function, wherein the multiple traffic patterns correspond to one or more anomalies in a network latency of the core network, and wherein the first machine learning model is configured using multiple training patterns that correspond to an expected network latency of the core network;

determine, using a second machine learning model, one or more user plane function events causing the one or more anomalies, wherein the one or more user plane function events is determined using the traffic data, and wherein the second machine learning model is configured to:

identify a portion of the traffic data that includes the one or more anomalies, and provide the one or more user plane function events using the portion of the traffic data; and transmit a reconfiguration command to the core network to adjust one or more routing policies of the user plane function using the determined one or more user plane function events, wherein the reconfiguration command is configured to align the network latency with the multiple training patterns.

9. The non-transitory, computer-readable storage medium of claim 8, wherein the instructions cause the computer system to:

form a training dataset by applying at least one of data cleaning, feature engineering, or data transformations to the traffic data; and train at least one of the first machine learning model or the second machine learning model using the training dataset.

10. The non-transitory, computer-readable storage medium of claim 8, wherein the one or more anomalies is a first set of anomalies, wherein the first machine learning model is configured to generate a second set of anomalies using a change of the network latency, and wherein the change of the network latency includes changes in one or more of: average latency, peak latency, or latency distribution over time.

11. The non-transitory, computer-readable storage medium of claim 8, wherein the instructions cause the computer system to measure a respective query runtime of each of multiple machine learning models to process the traffic data, and wherein the measurement of the respective query runtime is based on one or more of: execution time, memory usage, or computational efficiency of a corresponding model.

12. The non-transitory, computer-readable storage medium of claim 8, wherein the second machine learning model has a lower query runtime than a respective query runtime of each of multiple machine learning models.

13. The non-transitory, computer-readable storage medium of claim 8, wherein the instructions cause the computer system to trigger one or more alarms, and wherein the one or more user plane function events satisfy one or more predetermined criteria.

14. The non-transitory, computer-readable storage medium of claim 8, wherein at least one of: the first machine learning model or the second machine learning model is one or more of: an anomaly detection model, a forecasting model, or a trend detection model, wherein the anomaly detection model is configured to identify one or more outliers within the traffic data, wherein the forecasting model is configured to predict one or more future trends associated with the network latency within the core network based on the traffic data and the one or more outliers, and wherein the trend detection model is configured to identify one or more patterns that indicate expected traffic data using the one or more future trends, the one or more outliers, and historical traffic data.

15. A method comprising:

obtaining traffic data served by a user plane function of a telecommunications network;

determining, using a first machine learning model, a set of traffic patterns using the traffic data served by the user plane function, wherein one or more traffic patterns in the set of traffic patterns correspond to one or more anomalies in a network latency of the telecommunications network, and wherein the first machine learning model is configured using training patterns that correspond to an expected network latency of the telecommunications network;

determining, using a second machine learning model, one or more user plane function events causing the one or more anomalies, wherein the one or more user plane function events is determined using the traffic data, and wherein the second machine learning model is configured to:

identify a portion of the traffic data that includes the one or more anomalies, and provide the one or more user plane function events using the portion of the traffic data; and transmitting a reconfiguration command to the telecommunications network to adjust one or more routing policies of the user plane function using the determined one or more user plane function events, wherein the reconfiguration command is configured to align the network latency with the set of training patterns.

16. The method of claim 15, the method comprising:

forming a training dataset by applying at least one of data cleaning, feature engineering, or data transformations to the traffic data; and training at least one of the first machine learning model or the second machine learning model using the training dataset.

17. The method of claim 15, wherein the one or more anomalies is a first set of anomalies, wherein the first machine learning model is configured to generate a second set of anomalies using a change of the network latency, and wherein the change of the network latency includes changes in one or more of: average latency, peak latency, or latency distribution over time.

18. The method of claim 15, the method comprising measuring a query runtime of each model in multiple machine learning models to process the traffic data, wherein the measurement of the query runtime is based on at least one of: execution time, memory usage, or computational efficiency of a corresponding mode.

19. The method of claim 15, wherein the second machine learning model has a lower query runtime than a respective query runtime of each of multiple machine learning models.

20. The method of claim 15, wherein at least one of: the first machine learning model or the second machine learning model is one or more of: an anomaly detection model, a forecasting model, or a trend detection model, wherein the anomaly detection model is configured to identify one or more outliers within the traffic data, wherein the forecasting model is configured to predict one or more future trends associated with the network latency within the core network based on the traffic data and the one or more outliers, and wherein the trend detection model is configured to identify one or more patterns that indicate expected traffic data using the one or more future trends, the one or more outliers, and historical traffic data.

\* \* \* \* \*